Figure 1:
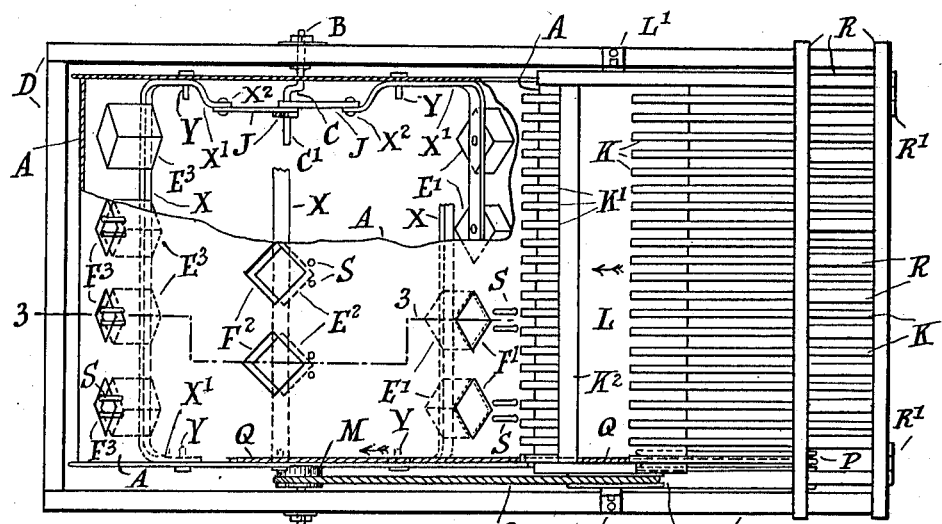

E. E. WAGG.
FRUIT AND OTHER GRADER.
APPLICATION FILED NOV. 16, 1911.

1,027,089.

Patented May 21, 1912.

UNITED STATES PATENT OFFICE.

EDWARD ERNEST WAGG, OF RANELAGH, VIA HOBART, TASMANIA, AUSTRALIA.

FRUIT AND OTHER GRADER.

1,027,089.   Specification of Letters Patent.   Patented May 21, 1912.

Application filed November 16, 1911. Serial No. 660,682.

*To all whom it may concern:*

Be it known that I, EDWARD ERNEST WAGG, a subject of the King of Great Britain and Ireland, &c., residing at Ranelagh, via Hobart, in the State of Tasmania, Commonwealth of Australia, have invented certain new and useful Improvements in Fruit and other Graders; and I do hereby declare the following to be a full, clear, and exact description of the invention, such as will enable others skilled in the art to which it appertains to make and use the same.

This invention relates to a grading machine, for fruit or other goods, which is rapid in action and economical of floor space.

My principal feature is a provision for the grading of goods without damaging or bruising the same by means of movable pockets or receivers located with their mouths in the vicinity of movable openings whereby the inlets to and exits from the pockets vary in size during the operation, the goods themselves furnishing when desired driving power. A cylindrical or polygonal grading drum, disk, or wheel or the like of any suitable dimensions is provided, and made rotatable upon any suitable bearings, and has a periphery or part provided with a series of apertures or frames to act in turn as inlets and outlets as explained later. To each said aperture or the like is provided a pocket or receiver of any suitable form and detail each adapted to receive an apple or other suitable fruit, or article of goods to be graded. These and other elements are indicated in the drawings herewith, which diagrammatically illustrate features of a grader according to my invention without showing minor or accessory details which would be obvious or well known, and which may be used in practice.

Figure 2:
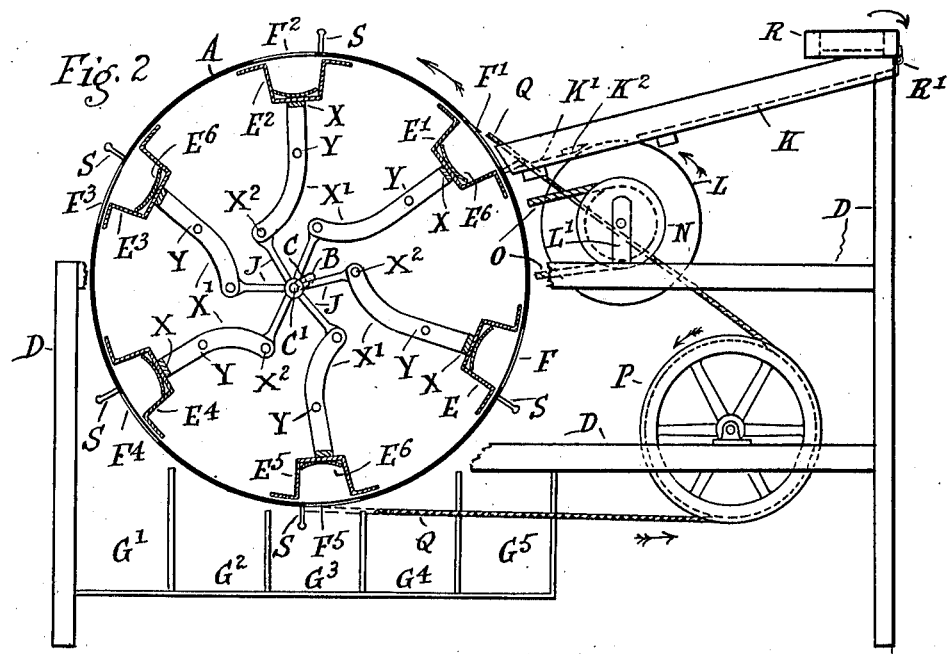

Figure 1 is a plan view, with part of the drum broken away; and Fig. 2 is a side elevation with the drum in vertical section on for example line 3 of Fig. 1.

In these views A is a drum face or other suitable movable member, with apertures as at F, $F^1$, $F^2$, $F^3$, $F^4$, $F^5$, any number being provided, the larger the member the more surface existing for apertures. I may provide in the periphery of the member rows of apertures in alternate circumferential parallel lines, or otherwise. Thus rows of 4 and 3 apertures alternately are usable—see Fig. 1, in which however for simplicity of drawings some apertures are not shown. There might be used a wider drum with more apertures abreast or a narrower one, the latter suitable for an orchard. The pockets may be of any suitable material, shape and size,—perforated to allow rubbish to fall through or otherwise. They have any suitable mouths, circular or otherwise, but shown square in the illustrations, square apertures being also shown. Rubber pockets are very useful, so also are metal ones with false bottoms of felt as at $E^6$ to avoid the bruising of fruit.

As the grading drum or member is rotated the pockets marked E, $E^1$, $E^2$, $E^3$, $E^4$, $E^5$, become loaded as from a chute or feeder shown made of slats or combs K and $K^1$, with a feed drum L described later. Some of the slats $K^1$, are shown in front of a crossbar $K^2$. Each pocket takes up for example, one apple. To enable the loads to be picked up, there are any suitable guides on the chute and horns or projections S at the rear of each aperture, so that the horns as they rotate rise below the apples for example and lift the latter, and tip or roll the same into the apertures and thus into the pockets. The pockets will be (as explained later) rotated also, but they at first do not keep up with the apertures of the drum. Afterward their motion is accelerated to make up the loss. The required action is secured by any suitable mechanism, as pivoted levers $X^1$ connecting links J and a fixed member C $C^1$ described later. There is a transverse bar X to each row of pockets, and the sides of each bar X form levers $X^1$.

At the points where the fruit enters the pockets, the latter are located in register each with its aperture so that the largest as well as any smaller sized goods can be pocketed.

D indicates any suitable machine frame, supporting as by ball bearings, drum axles or the like B.

C $C^1$ is any suitable fixed member, having a part $C^1$ not in line with axles B. On part $C^1$ links J are connected pivotally, as at one side of the drum, each link being also pivoted to a lever $X^1$, as by a pin $X^2$. As pivots of levers $X^1$ there are pins or projections Y from the drum sides or the like. These levers $X^1$ at each side of the drum having the transverse bars X support the pockets. Pivots $X^2$ are equidistant from center $C^1$, but the apertures F to $F^5$ have the drum axles B as their center, the motion of the pockets being controlled by the positions of center $C^1$ and the aforesaid pivots at $X^2$ and Y.

When parts $E^1$ and $F^1$, where the feed to the pockets occurs, are in register the distance between the nearest pivot Y and center $C^1$ is at the maximum. This registration is, in making the machine, located where desired; in practice it is nearer the drum top than is illustrated, where more power is to be secured from the gravity of the goods, the said gravity being utilized as explained later. In the position aperture $F^2$ is shown in, the distance between the pivot Y nearest thereto, and center $C^1$ has decreased below the said maximum because a link J has swung the nearest arm $X^1$ on its pivot causing pocket $E^2$ to swing backward. In the position aperture $F^4$ is shown in the distance between the center $C^1$ and pivot Y is at about its minimum; hence in this position the exit for fruit or so forth is at the minimum. From position $F^4$ onward as will now be evident the exits enlarge till about the position F of final discharge for say the largest apples or position $F^1$ for taking up a fresh load is reached. So, as each pocket rotates after being loaded the inlet to it is at first narrowed more and more until when the inlet comes to the under side of the drum as at $F^4$ it becomes an exit, which allows the fruit to fall out provided the fruit is small enough as the exit at this stage is of or nearly of minimum size. Thus goods of the smallest grade first fall out; then the exit gradually enlarges so that each fruit automatically falls out at about the time when the exit becomes sufficiently large to suit it.

Any suitable conductors or distributers will receive the discharged articles, for example chutes $G^1$, $G^2$, $G^3$, $G^4$, $G^5$, the number being varied easily at will, and these are made of or with canvas, rubber, or in any bruise avoiding way, such details forming no part of my claimed construction, many well known receivers existing.

In the construction I prefer to utilize the weight of the fruit entering the pockets; from about upper point $F^2$ of the drum the motion of the loaded pockets is downward, while during most of the upward motion of the pockets they will return empty. Hence by gravity they rotate the drum or assist therein. To provide against stoppage however from irregularity of feed a fly wheel P or the like is provided, of any suitable weight, with a drive chain or the like Q geared upon the drum or to some connection thereof.

Attached to the side of grade drum A or the like I provide a sprocket wheel or pulley M with a chain or belt O to turn any suitable wheel N fixed to a feed drum L or the like to impel fruit toward the pockets. The feed device may vary and be independent of the grading mechanism. Directions of rotation are shown by arrows.

$L^1$ are brackets having the bearings of drum L.

R shows part of a tray hinged as at $R^1$ or movable. This when required separates extra large apples or goods that are not suitable grading. Tray R can be turned down in the direction of the arrow to discharge its contents or to be out of the way when not required as a separator. Comb K is shown in Fig. 1, extending under tray R. The connections X or the like may be located so as to connect to the pocket mouths instead of their bases as shown. They may simply move the said mouths, or move a ring or slide providable to each mouth,—in each case the passages for goods from and to the pocket being restricted and returned to normal alternately to produce the effects already indicated. When flexible or rubber pockets are used such minor details will naturally be adopted as may be deemed suitable. Whenever desired, the fly wheel or the grading member or drum will be driven by any suitable added power.

Other modifications are also practicable within the scope of my claims.

What I claim as my invention is:—

1. A fruit grading machine comprising in combination, a rotary cylinder shell provided with a plurality of openings, a guide delivering the fruit to the periphery of said cylinder abreast of said openings, pockets in said cylinder for receiving the fruit passing through said openings, and mechanism for adjusting the pockets during rotation of the cylinder and with respect to said openings to discharge the fruit at different points during rotation of said cylinder, substantially as described.

2. A fruit grading machine comprising in combination, a rotary cylinder provided with a plurality of openings, a guide delivering the fruit to the periphery of said cylinder abreast of said openings, pockets in said cylinder for receiving the fruit passing through said openings, and crank and lever mechanism for adjusting the pockets during rotation of the cylinder to discharge the fruit at different points during rotation of the cylinder, substantially as described.

3. A fruit grading machine comprising in combination, means for delivering the fruit, and rotary grading mechanism for receiving the fruit from said means during its upward travel and discharging the fruit during its downward travel whereby the weight of the fruit is utilized to assist in rotating the said mechanism, substantially as described.

4. A fruit grading machine comprising in combination, means for delivering the fruit, and a cylindrical rotating grading mechanism for receiving the fruit from said means during its upward travel and discharging the fruit during its downward travel whereby the weight of the fruit is utilized to assist in rotating said mechanism, substantially as described.

5. A fruit grading mechanism comprising in combination, means for delivering the fruit, a rotary grading mechanism for receiving the fruit from said means during its upward travel and discharging the fruit during its downward travel, and means for causing discharge of the fruit at different points during rotation of said mechanism, substantially as described.

6. A fruit grading machine comprising in combination, a rotary member provided with openings to receive and discharge the fruit to and from said member, pockets for said openings to hold the fruit received through said openings, and means for adjusting the pockets with respect to said openings during rotation of said member to control ingress and egress of the fruit to and from said pockets, substantially as described.

In witness whereof I have hereunto set my hand in the presence of two witnesses.

EDWARD ERNEST WAGG.

Witnesses:
  LESLIE GEORGE COLLIS,
  ALISON BAE.

Copies of this patent may be obtained for five cents each, by addressing the "Commissioner of Patents, Washington, D. C."